US008892857B2

(12) United States Patent
Ozols et al.

(10) Patent No.: US 8,892,857 B2
(45) Date of Patent: Nov. 18, 2014

(54) QUANTUM REJECTION SAMPLING

(75) Inventors: Maris Ozols, Waterloo (CA); Martin Roetteler, Robbinsville, NJ (US); Jérémie Roland, Brussels (BE)

(73) Assignee: NEC Laboratories America, Inc., Princeton, NJ (US)

( * ) Notice: Subject to any disclaimer, the term of this patent is extended or adjusted under 35 U.S.C. 154(b) by 381 days.

(21) Appl. No.: 13/362,628

(22) Filed: Jan. 31, 2012

(65) Prior Publication Data

US 2012/0210111 A1 Aug. 16, 2012

Related U.S. Application Data

(60) Provisional application No. 61/442,421, filed on Feb. 14, 2011.

(51) Int. Cl.
*G06F 15/177* (2006.01)
*G06N 99/00* (2010.01)
*B82Y 10/00* (2011.01)

(52) U.S. Cl.
CPC .............. *G06N 99/002* (2013.01); *B82Y 10/00* (2013.01)
USPC .............................................. 713/1; 713/100

(58) Field of Classification Search
CPC ................. G11B 20/10009; G11B 20/10037; G11B 20/10046; G11B 20/10425; G11B 20/14; G11B 20/22; G11B 20/10222; G11B 2220/2537; G06N 99/002; B82Y 10/00; B82Y 20/00; H04L 9/0852
See application file for complete search history.

(56) References Cited

U.S. PATENT DOCUMENTS

| | | | | |
|---|---|---|---|---|
| 7,028,275 | B1 * | 4/2006 | Chen et al. | ..................... 716/136 |
| 2003/0173997 | A1 * | 9/2003 | Blais et al. | ...................... 327/34 |
| 2007/0288684 | A1 * | 12/2007 | Bergou et al. | ................. 711/101 |
| 2010/0150222 | A1 * | 6/2010 | Meyers et al. | ................ 375/240 |

OTHER PUBLICATIONS

Brassard, G., et al. "Quantum Amplitude Amplification and Estimation" Quantum Computation and Quantum Information Systems, Contemporary Math Series, vol. 305. May 2000. pp. 1-22.

Dillon, J. "Multiplicative Difference Sets Via Additive Characters" Designs, Codes and Cryptography. vol. 17, No. 1-3. Sep. 1999. pp. 225-235.

(Continued)

*Primary Examiner* — Dennis M Butler
(74) *Attorney, Agent, or Firm* — Joseph Kolodka

(57) ABSTRACT

Systems and methods for transforming an initial quantum state to a target quantum state are disclosed. The initial quantum state is denoted by superposed initial quantum sample states and the target quantum state is denoted by superposed target quantum sample states. The initial quantum state is initialized with a set of primary registers for the initial quantum state and with at least one ancillary register. The initial quantum state is transformed such that the set of primary registers reflects the initial quantum sample states and the at least one ancillary register is varied to compose an intermediate quantum state. In addition, the intermediate quantum state is amplified by implementing quantum state rotations in accordance with a plurality of reflections on the intermediate quantum state such that the reflections result in the target quantum sample states of the target quantum state with a discarding of the at least one ancillary register.

20 Claims, 6 Drawing Sheets

(56) References Cited

OTHER PUBLICATIONS

Dobbertin, H. "Construction of Bent Functions and Balanced Boolean Functions With High Nonlinearity" Fast Software Encryption: Second International Workshop. Proceedings. Lecture Notes in Computer Science. Dec. 1994. pp. 61-74.

Harrow, A., et al. "Quantum Algorithm for the Linear Systems of Equations" Physical Review Letter. Oct. 2009. (4 Pages).

Grover, L. "Synthesis of Quantum Superpositions by Quantum Computation" Physical Review Letters. Aug. 2000. pp. 1334-1337.

* cited by examiner

QUANTUM REJECTION SAMPLING

RELATED APPLICATION INFORMATION

This application claims priority to provisional application Ser. No. 61/442,421 filed on Feb. 14, 2011, incorporated herein by reference.

BACKGROUND

1. Technical Field

The present invention relates to quantum computing and, more particularly, to systems, methods and devices for preparing quantum states.

2. Description of the Related Art

Rejection sampling is a technique for producing samples from a target distribution by starting from samples from another distribution. The method has first been formalized by von Neumann (1951) and has many applications in classical computing. The classical rejection method solves the following resampling problem: given the ability to sample according to some probability distribution p, produce samples from some other distribution q. The method works as follows: let $\gamma \leq 1$ be the largest scaling factor such that $\gamma q$ lies under p, formally, $\gamma = \min_k (p_k/q_k)$. A sample k is accepted from p with probability $\gamma q_k/p_k$, otherwise the sample is rejected and the process is repeated. The expected number of samples from p to produce one sample from q is then given by $T = 1/\gamma = \max_k (q_k/p_k)$, which has been proved to be optimal. FIG. 11 provides a visualization of this sampling method. In particular, FIG. 11 is a graph 1100 of Probability v. Sample space (denoted by variable k), where curve 1102 is an example of $p_k$ and curve 1104 is an example of $\gamma q_k$. As indicated above, $$Prob(\text{accept } k) = \frac{\gamma q_k}{p_k}.$$

This technique is at the core of many sampling algorithms and has therefore numerous applications, in particular, in the field of Monte Carlo simulations, the most well-known example being the Metropolis algorithm. It is used extensively in Monte Carlo simulations since the simulations seek to sample from distributions that are defined on some extremely high-dimensional spaces and for which sometimes no direct way of sampling is known. Rejection sampling then permits sampling from the target distribution, provided that another, much easier to obtain, distribution can be sampled from.

SUMMARY

One embodiment is directed to a method for transforming an initial quantum state, denoted by superposed initial quantum sample states, to a target quantum state, denoted by superposed target quantum sample states. The initial quantum state is initialized with a set of primary registers for the initial quantum state and with at least one ancillary register. The initial quantum state is transformed such that the set of primary registers reflects the initial quantum sample states and such that the at least one ancillary register is varied to compose an intermediate quantum state. In addition, the intermediate quantum state is amplified by implementing quantum state rotations in accordance with a plurality of reflections on the intermediate quantum state such that the reflections result in the target quantum sample states of the target quantum state with a discarding of the at least one ancillary register.

An alternative embodiment is directed to computer readable storage medium comprising a computer readable program. The computer readable program when executed on a computer causes the computer to direct the transformation of an initial quantum state, denoted by superposed initial quantum sample states, to a target quantum state, denoted by superposed target quantum sample states, by performing steps of a method. In accordance with the method, the initial quantum state is initialized with a set of primary registers for the initial quantum state and with at least one ancillary register. In addition, a transformation of the initial quantum state is directed such that the set of primary registers reflects the initial quantum sample states and such that the at least one ancillary register is varied to compose an intermediate quantum state. Further, the steps of the method include directing an amplification of the intermediate quantum state by implementing quantum state rotations in accordance with a plurality of reflections on the intermediate quantum state such that the reflections result in the target quantum sample states of the target quantum state with a discarding of the at least one ancillary register.

Another embodiment is directed to a system for transforming an initial quantum state, denoted by superposed initial quantum sample states, to a target quantum state, denoted by superposed target quantum sample states. The system includes a quantum memory element, a quantum interaction controller and a quantum computation module. The quantum interaction controller is configured to change quantum states of the quantum memory element by implementing quantum state rotations. In addition, the quantum computation module is configured to initialize the initial quantum state with a set of primary registers for the initial quantum state and with at least one ancillary register. The quantum computation module is further configured to direct the quantum interaction controller to transform the initial quantum state such that the set of primary registers reflects the initial quantum sample states and the at least one ancillary register is varied to compose an intermediate quantum state. Additionally, the quantum computation module is also configured to direct the quantum interaction controller to amplify the intermediate quantum state by implementing the quantum state rotations in accordance with a plurality of reflections on the intermediate quantum state such that the reflections result in the target quantum sample states of the target quantum state with a discarding of the at least one ancillary register.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
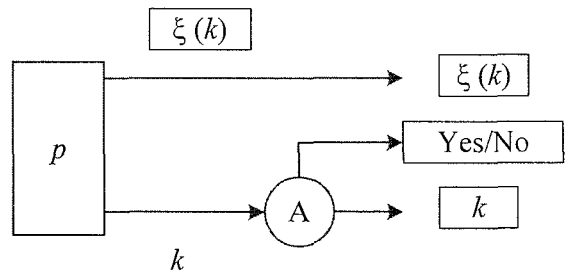
FIG. 1 is a high-level block/flow diagram of an overview of a classical rejection sampling method.

Embodiments of the present principles provide a means to prepare quantum states in a quantum computer. For example, the memory of a quantum computer can in principle be loaded with arbitrary quantum states. Preparing arbitrary quantum states in an efficient manner would lead to tremendous computational power. In particular, such formidable tasks as deciding whether two graphs are isomorphic or not could be decided easily, or any problem in Quantum Merlin Arthur (QMA), which is a quantum analog of the classical class of NP complete problems, could be decided easily. As such, in quantum computing is therefore desirable to find methods that permit the efficient preparation of selected target quantum states into the memory and to find algorithms that leverage the fact that a state preparation has already been performed successfully.

In accordance with one exemplary aspect, methods and systems described herein below can prepare specific quantum states by exploiting some additional information that is available about the states. The approach applied by embodiments utilizes a novel rejection sampling technique that permits sampling from a target probability distribution, provided that a sampler from a given distribution is available. In particular, a given quantum state can be mapped to a target quantum state by making a specific, controlled sequence of several rotations that bring the quantum state step-by-step closer to the target state. Given a black box producing a coherent superposition of quantum states with some amplitudes, the present principles can be used to prepare a coherent superposition of the same states with different target amplitudes.

Aspects described herein provide significant advantages over other solutions that address the general problem of quantum state generation. For example, the techniques described herein are significantly more efficient than approaches that attempt to solve quantum state preparation by applying sequences of controlled rotations (typically of exponential length) to fix the amplitudes of the target state one qubit at a time or other computationally expensive techniques that reduce the problem to instances of search problems. In contrast to the present principles, these approaches do not exploit the structure of the quantum mechanical memory system.

In accordance with aspects of the present principles, writes on a quantum memory can be efficiently implemented by employing amplitude modifications on quantum states through a series of transformations to configure the memory to be in desired target states. In particular, one or more ancillary registers can be employed to modify the amplitude of the quantum state of the memory such that a discarding of the register(s) results in the desired target state. As discussed in more detail herein below, only one ancillary register can be sufficient for this purpose. Here, the quantum states of samples of the memory can be kept constant and the amplitudes of the quantum states can be varied by implementing quantum state rotations. As such, a given initial state can be modified or "massaged" toward a target state using quantum state rotations. Writing and reading the quantum memory in this way is substantially more efficient than brute-force quantum state preparation methods described above, which consume much more resources and are considerably slower than the present methods.

There are several potential applications of the methods and system described herein. For example, they can be used as tools for the design of new quantum algorithms. Moreover, in some cases, they can be used as a direct solution to a problem such as the hidden shift problem for Boolean functions. The methods can also provide an optimal algorithm that can be derived by studying a "water-filling" of the Fourier spectrum of the given Boolean function.

Embodiments described herein may be entirely hardware or may include both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium, such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In accordance with exemplary embodiments described herein, a quantum form of rejection sampling is developed. Given a coherent superposition of (possibly unknown) quantum mechanical states with some amplitudes, the methods described herein prepare a coherent superposition of the same states, albeit with different target amplitudes. The methods can achieve this task through several steps. First, a quantum register is initialized with the given coherent superposition of states. Then, an additional quantum register, which acts as an ancillary register, is added to the overall system and initialized in a known state. Subsequently, the register holding the initial superposition and the ancillary register are transformed by applying a controlled rotation of the ancillary register. The angle of this controlled rotation depends on the state of the register holding the initial superposition. By carefully choosing the angle of this rotation, it is possible to rotate the amplitudes of these two registers in such a way that it becomes precisely the amplitude of the target state, provided that the ancillary register is in the known state mentioned before. The rotation itself is implemented by an amplitude amplification process. The final step of the procedure includes measuring the ancillary register and, conditioned on the outcome of the measurement, selecting only the runs of the process in which the ancillary register was found in the ground state.

As demonstrated in this disclosure, it becomes possible to prepare any intended target state from any given initial state, while preserving possible entanglement of the initial state with further states. We provide a tight characterization of the number of preparations of the initial state that is used to solve this quantum state generation problem. The analysis is based on semi-definite programming and demonstrates that the associated algorithm is optimal with regard to the number of initial state preparations that are used in any algorithm that seeks to prepare the final state from the initial state.

In an important application, the method can be used to solve hidden shift problems over the Boolean hypercube. In such problems, the task is to identify an unknown offset ('shift') between two functions. The difficulty consists in identifying the offset in as few invocations of the two functions as possible. Using the quantum rejection sampling method, it is possible to identify the hidden shift in a number of invocations that is given by "water filling" vectors of the Fourier spectra of the two functions.

Prior to discussing embodiments of the present principles in detail some basic aspects of quantum state preparation should be noted. As indicated above, quantum state preparation can be considered as a quantum counterpart of classical sampling and as such is a very useful technique in quantum computing. Indeed, many algorithmic problems reduce to quantum state preparation problems. For example, Graph Isomorphism reduces to preparing the uniform distribution over permutations of a graph. A quantum version of the resampling problem is developed herein below: given an oracle generating a quantum state $\Sigma_{k=1}^{n}\alpha_k|\xi_k\rangle|k\rangle$, where amplitudes $\alpha_k$ are known but states $|\xi_k\rangle$ are unknown, prepare a target state $\Sigma_{k=1}^{n}\beta_k|\xi_k\rangle|k\rangle$ with the different amplitudes $\beta_k$ but the same states $|\xi_k\rangle$. Quantum resampling is a useful primitive for building quantum algorithms.

1. Classical and Quantum Models

To aid in understanding the quantum rejection sampling embodiments of the present principles, the classical and quantum sampling problems are formalized herein below. To make the problem meaningful in the context of query complexity, some slight adaptations should be made. Indeed, if distribution q is known to begin with, there is no need to use the ability to sample from p. As such, we introduce a function $\xi$ that deterministically associates some unknown data with each sample with the constraint that this data is preserved during the sampling process in the following sense:

Definition 1 (Resampling Problem):

Let p, q be probability distributions over [n]. Given oracle access to a black box producing pairs $(k,\xi(k))\in[n]\times[d]$ such that k is distributed according to p, where $\xi:[n]\to[d]$ is an unknown function, the $SAMPLING_{p\to q}$ problem is to produce a sample $(k,\xi(k))$ such that k is distributed according to q.

In this model it is no longer possible to produce the needed samples without using the access to the oracle that produces the samples from p. The rejection method can be used to solve this problem. FIG. 1 provides an exemplary illustration of the classical rejection sampling method.

Figure 2:
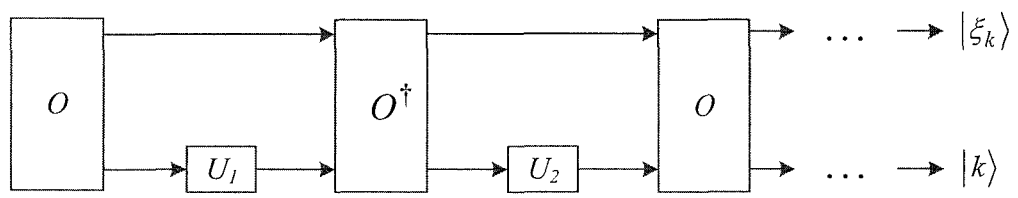
FIG. 2 is a high-level block/flow diagram of an overview of an embodiment of a quantum rejection sampling method.

In accordance with aspects of the present principles, $SAMPLING_{p\to q}$ is adapted for quantum states, where probability distributions are replaced by quantum superpositions. Aspects described herein consider any initial superposition to permit approximate preparation of the target state. FIG. 2 provides an exemplary illustration of the classical rejection sampling method.

Definition 2 (Quantum Resampling Problem):

Let $\alpha,\beta\in\mathbb{R}^n$ be such that $\|\alpha\|_2=\|\beta\|_2=1$ and $\alpha_k,\beta_k\geq 0$ for all $k\in[n]$. Let O be a unitary that acts on a default state $|0\rangle_{dn}\in\mathbb{C}^d\otimes\mathbb{C}^n$ as $$O=|0\rangle_{dn}\mapsto|\alpha\rangle:=\Sigma_{k=1}^{n}\alpha_k|\xi_k\rangle|k\rangle, \qquad (1)$$

where $|\xi_k\rangle\in\mathbb{C}^d$ are some fixed unknown normalized quantum states. Given oracle access to unitary black boxes $O,O^\dagger$, the $QSAMPLING_{\alpha\to\beta}$ problem is to prepare the state $$|b\rangle = \sum_{k=1}^{n}\beta_k|\xi_k\rangle|k\rangle. \qquad (2)$$

For any success probability p, the $QSAMPLING_{\alpha\to\beta}^p$ problem corresponds to the approximate version where it is sufficient to prepare a state $|c\rangle:=\Sigma_{k=1}^{n}\gamma_k|\xi_k\rangle|k\rangle$ such that $|\langle b|c\rangle|^2\geq p$ (where $\|\gamma\|_2=1$ and $\gamma_k\geq 0$ for all $k\in[n]$).

It should be noted that a special case of this problem is the scenario d=1, when $\xi_k\in\mathbb{C}$ are just unknown phases (complex numbers of absolute value 1).

2. Preliminary Points

In accordance with the present principles, a full characterization of the query complexity of $QSAMPLING_{\alpha\to\beta}^p$ can be made as follows.

Theorem 1.

Let $p_{min}:=(\beta^T\cdot\alpha)^2$ and $p_{max}:=\Sigma_{k:\alpha_k>0}|\beta_k|^2$. The quantum query complexity of $QSAMPLING_{\alpha\to\beta}^p$ for $p\in[p_{min},p_{max}]$ is $\Theta(1/\|\epsilon\|_2)$, where $\epsilon_k=\min\{\alpha_k,\gamma\beta_k\}$ for $\gamma\in\{0,1\}$ such that $\beta^T\cdot\hat\epsilon=\sqrt{p}$. For $p\leq p_{min}$, the query complexity is 1, and for $p>p_{max}$, it is infinite.

Here $\hat\epsilon:=\epsilon/\|\epsilon\|_2$ denotes a unit vector in direction $\epsilon$. It is noted that when $p=p_{max}=1$, the query complexity reduces to $\max_k(\beta_k/\alpha_k)$, similar to the classical case, except that amplitudes replace probabilities.

It should be further noted that the techniques described herein can be applied to the following problem.

Definition 3 (Boolean Hidden Shift Problem).

Let $f:\mathbb{F}_2^n\to\mathbb{F}_2$ be a Boolean function. The Boolean hidden shift problem for $f$ ($BHSP_f$) is the following: given oracle access to shifted function $f_s(x):f(x+s)$ for some unknown value of $s\in\mathbb{F}_2^n$, with the promise that there exists x such that $f(x+s)\neq f(x)$, determine the value of s.

As shown herein below, this problem can be solved by solving the $QSAMPLING_{\alpha\to\beta}^p$ problem for $\alpha$ corresponding to the Fourier spectrum of $f$, and $\beta$ being a uniformly flat vector. This leads to the following upper bound.

Theorem 2.

Let $f$ be a Boolean function and $\hat f$ denote its Fourier transform. The quantum query complexity of solving $BHSP_f$ with success probability p is $O(1/\|\epsilon\|_2)$, where $\epsilon_w = \min\{|\hat{f}_w|, \gamma/\sqrt{2^n}\}$ for $\gamma \in [0,1]$ such that $\|\hat{\epsilon}\|_1 = \sqrt{2^n}p$.

3. Quantum Rejection Sampling Methods and Systems

The exemplary methods described herein below are based on amplitude amplification on an ancillary register. A corresponding algorithm is described in a general form and it is shown that its cost can be captured by a semidefinite program (SDP). In particular, a sequence of alternating reflections can be applied, where its query complexity is given by a semidefinite program. Solutions of this SDP, and hence the corresponding algorithms applied, can depend on the ratio between the amplitudes of the initial and target states. The cost is characterized by solving this SDP, and it is shown that it has a rank-1 solution. This implies that it suffices to use just one ancillary qubit to perform the amplitude amplification. This observation permits a significant simplification of the algorithm. The simplified algorithm with a single qubit ancillary register is given explicitly in Section 3.3 below.

3.1 Description of the Systems and Methods

Figure 3:
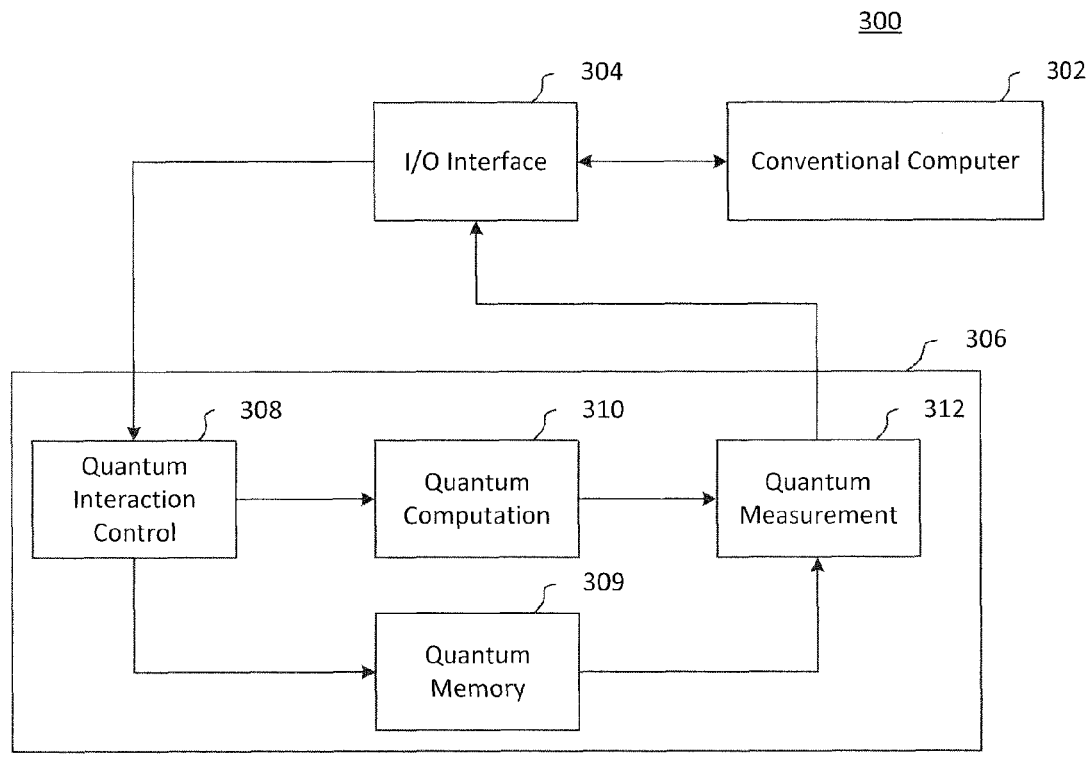
FIG. 3 is a high-level block/flow diagram of an embodiment of a system for transforming an initial quantum state to a target quantum state.

With reference now to FIG. 3, an exemplary embodiment of a quantum computer system 300 that can implement the methods described herein in accordance with the present principles is illustratively depicted. The quantum computer system 300 can include classical and quantum components. For example, the system 300 can include a classical/conventional computer device 302, an input/output (I/O) interface 304 and a quantum mechanical component 306, which comprises functions or modules for quantum control 308 on a quantum memory device 309, a quantum computation module 310 and a quantum measurement module 312. The elements 308, 310 and 312 can each be implemented in hardware or hardware and software, as stated above. As described in more detail herein below, the quantum computation module 310 can employ the quantum controller 308 to initialize the quantum memory 309 in a desired target quantum state. For example, the quantum computation module 310 can be configured to determine changes of quantum states, such as, for example, appropriate reflections, that can be implemented by the quantum controller 308 on the physical quantum memory 309. In addition, the quantum measurement module 312 can be configured to measure the state of the quantum memory 309 to enable the quantum computation module 310 to determine whether the quantum controller 308 had effected the changes in the quantum memory 309. Moreover, the quantum measurement module 312 can be configured to perform measurements on the quantum memory 309 to output data stored in the memory in response to read requests through the I/O interface 304.

It should be noted that exemplary embodiments can employ superconducting qubits. For example, in one practicable application, a concrete description of a quantum mechanical system in the form of a Hamiltonian is considered. A natural time evolution of a system governed by a Hamiltonian H for a time t is given by a unitary operator $e^{-iHt}$. The Hamiltonian that describes the physical system can be, e.g., of ZZ-type or of the form:

$$H = \sum_{j=1}^{2} \frac{\Omega_j}{2}(\cos\phi_j \sigma_x^j - \sin\phi_j \sigma_y^j) + \frac{\Omega_{12}}{4}(\sigma_x^1 \sigma_x^2 - \sigma_y^3 \sigma_y^4).$$

Further embodiments of interest include superconducting qubits that are coupled using resonators. The quantum bits that are realized by the subsystems of the quantum mechanical system can be used as the elements of the quantum memory device 309.

The above-referenced equation for H shows the Hamiltonian for the natural coupling between two superconducting flux qubits. Here, $\Omega_j$ is the resonant microwave-induced single qubit Rabi frequency of qubit j. A typical value of $\Omega_j$ for a superconducting flux qubit system, realized as an Al/AlO$_x$ low temperature superconducting circuit with Josephson Junctions, is between 4 and 7 GHz. Further, $\phi_j$ is the microwave phase, a real number between 0 and $2\pi$, and $\sigma_y^j$ and $\sigma_x^j$ are Pauli spin matrices. The quantum interaction control module 308 can be implemented by applying microwave pulses at frequency $\Omega_{12}$ which corresponds to the term in the Hamiltonian responsible for driving the sum-frequency transition. A typical frequency for the term $\Omega_{12}$ is between 20 and 25 MHz.

The time-scale on which the control is applied depends strongly on the particular type of physical embodiment of the quantum computer. This also defines the limiting life time of the quantum memory that is implemented by the qubits. An example of a quantum computer built on low-temperature superconducting quantum circuits (Josephson Junctions) has values of $T_2$ of the order of a few nanoseconds and $T_1$ of the order of a few hundred nanoseconds. In recent realizations, the lifetime is even on the order of microseconds. Single qubit gates can be operated at frequencies between 4-6 GHz in a given implementation and two-qubit gates can be operated at frequencies between 20-25 MHz in the same implementation (as a low temperature Al/AlO$_x$ superconductor).

Another embodiment can employ nuclear magnetic resonance (NMR) qubits. Here, H is the system Hamiltonian of a molecule in a liquid state NMR quantum computer or a molecule in a solid state NMR quantum computer. In the embodiment directed to a liquid state NMR, only Hamiltonians H having ZZ interactions are possible. Here, the quantum interaction control module 308 is implemented via an application of radio frequency (RF) pulses that are in resonance with the ZZ terms of the Hamiltonian, thereby driving the system. In this embodiment, the elements of the quantum memory device consist of spins. In the embodiment directed to solid state NMR, homonuclear and heteronuclear dipole-dipole interactions can occur. For liquid state NMR systems, time-scales of decoherence time $T_2$ of the order 1-2 seconds and relaxation times $T_1$ of 10-100 seconds have been observed. In another embodiment, the methods described herein can be applied to qubits implemented by an ion trap. Here, the quantum interaction control module 308 can be implemented via laser pulses that are directed at the ions and elements of the quantum memory device 309 are the internal degrees of freedom of the ions.

Figure 4:
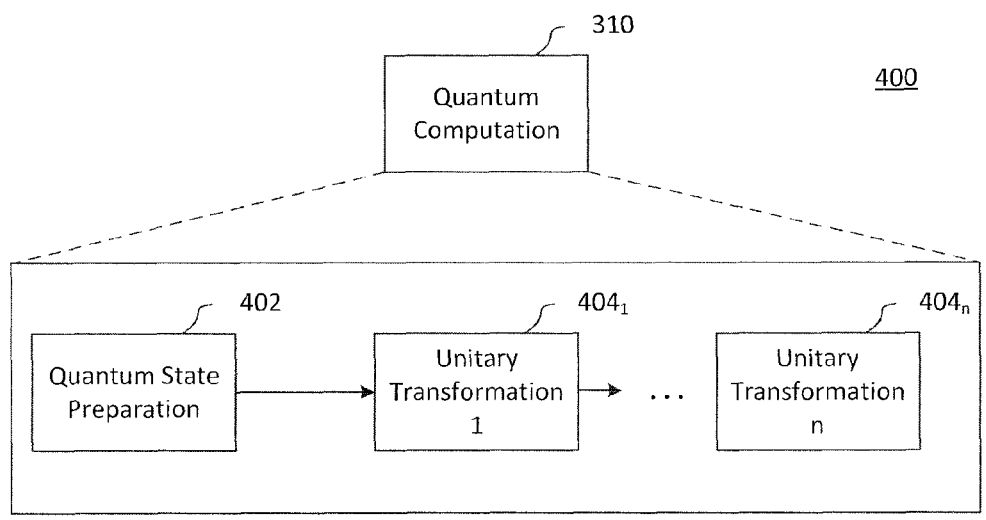
FIG. 4 is a high-level block/flow diagram of an embodiment of a quantum computation module.

Referring to FIG. 4, with continuing reference to FIG. 3, a high-level block/flow diagram 400 of an exemplary process implemented by the quantum computation module 310 is illustratively depicted. In particular, by directing the quantum controller 308 to alter the state of the memory 309 and by utilizing the quantum measurement module 312 to confirm that the state of the memory 309 is altered appropriately, as described in more detail herein below, the quantum computation module 310 can perform quantum state preparation 402 and perform a series of unitary transformations $404_1$-$404_n$. Specifically, the transformations can be employed to configure the quantum memory 309 in a desired target quantum state and thereby perform writes on the quantum memory 309 in an efficient manner. Here, the transformations can be utilized to change the amplitudes of a given quantum state towards a target quantum state.

Figure 5:
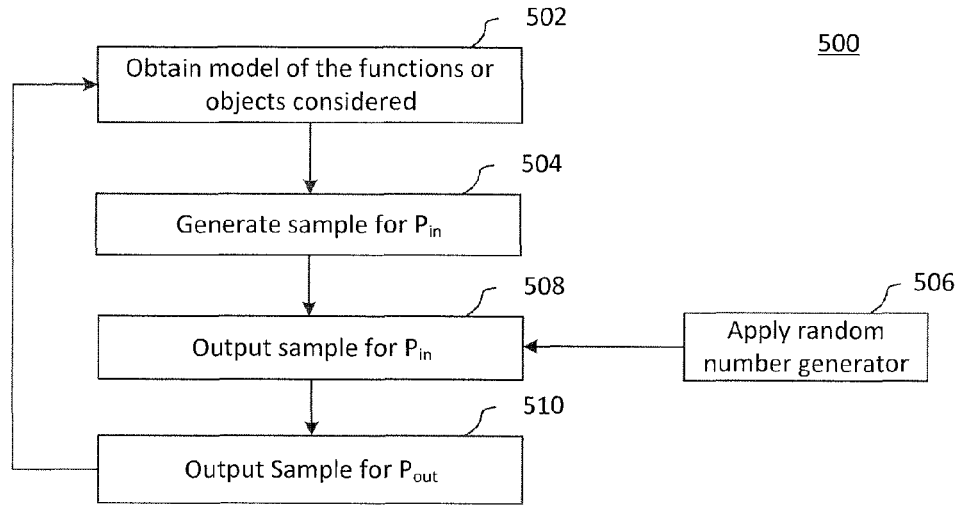
FIG. 5 is a high-level flow diagram of a classical rejection sampling method.
Figure 6:
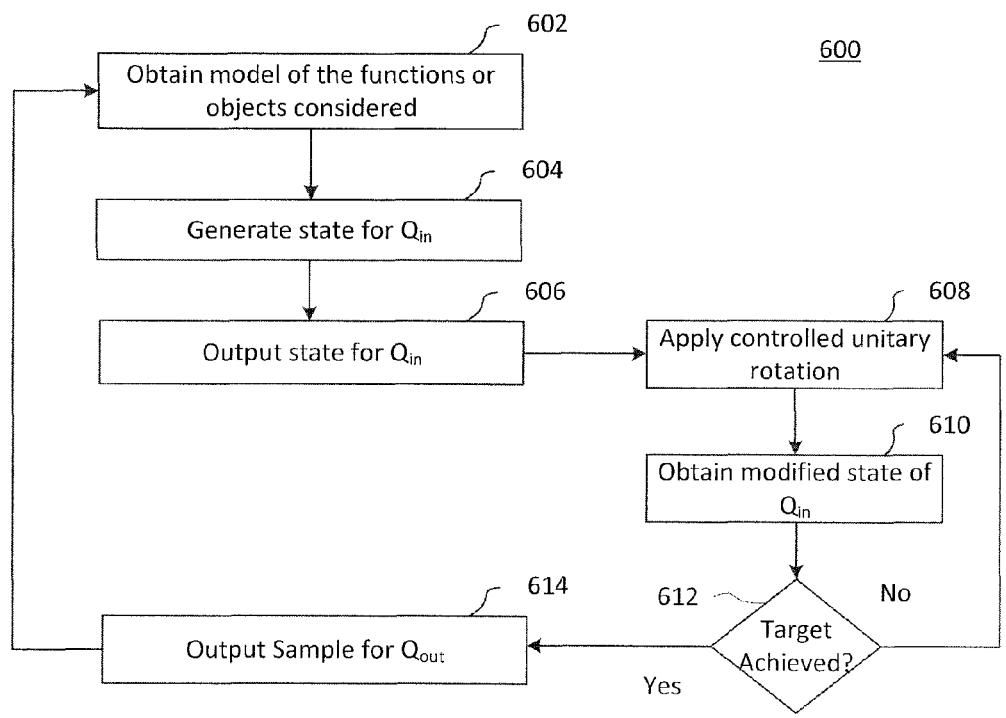
FIG. 6 is a high-level flow diagram of an embodiment of a quantum rejection sampling method.

With reference now to FIGS. 5 and 6, with continuing reference to FIG. 3, an exemplary overview of a classical rejection sampling method 500 and an exemplary overview of quantum rejection sampling method 600 in accordance with the present principles are respectively depicted. The classical rejection sampling method 500 can be referred to as an "accept/reject method" or "hit-and-miss sampling." Intuitively, the basic premise of the method 500 is to fit the probability distribution $P_{out}$ under a given distribution $P_{in}$. This is achieved by generating a random number u in the interval (0,1). Then, a sample x that is produced using $P_{in}$ is accepted if u is less than $P_{out}(x)/(c\ P_{in}(x))$, where c is a suitably chosen constant. For example, the method 500 can begin at step 502, at which models of the functions or objects considered can be obtained. At step 504, a sample can be generated for $P_{in}$. In addition, at step 508, with the aid of a random number generator applied at step 506, a sample for $P_{in}$ can be output if the above-recited constraint is met. Further, a sample for $P_{out}$ can also be output if the above-recited constraint is met. Thereafter, the method can be repeated.

In accordance with the exemplary quantum rejection sampling method 600, a given quantum input state $Q_{in}$ can be changed to a desired output quantum state $Q_{out}$. The method proceeds by applying stepwise rotations to bring the state closer to the target state. The process is stopped once a specified target accuracy has been achieved. The controlled rotations can be applied to one qubit only. The method 600 can begin at step 602, at which the quantum computation module 310 can obtain models of the functions or objects considered. For example, the quantum computation module 310 can generate the models or can receive the models, for example, through the I/O interface 304 from the conventional computer 302. At step 604, the quantum computation module 310 can generate a state for $Q_{in}$. At step 606, the quantum computation module 310 can output the state for $Q_{in}$ and can direct the quantum interaction controller 308 to apply controlled unitary rotations at step 608, as described in more detail herein below, to obtain a modified state of $Q_{in}$ in the memory 309, which can be measured by the quantum measurement module 312. Based on the measurements made by the quantum measurement module 312, the quantum computation module 310 can determine whether a target state within the specified target accuracy has been achieved. If not, then the method can proceed to and repeat step 608. If a target state within the specified target accuracy has been achieved, then the method can proceed to step 614 and can output a sample for $Q_{out}$ and the method can be repeated.

As indicated above, method implementations of the present principles for $QSAMPLING_{\alpha \to \beta}^p$ can be based on amplitude amplification. It is parameterized by states $\{|\phi_k\rangle \in C^n : 1 \leq k \leq n\}$ and a projector $\Pi$ to some subspace of $C^n$. We will show that the problem of optimizing these parameters can be cast as an SDP and its solution is described further herein below.

Initially, the oracle can be used to prepare the state $|a\rangle$, and then a third register of dimension n, initialized in some default state $|\hat{0}\rangle_n$, is attached:

$$O|\overline{0}\rangle_{dn} \otimes |\overline{0}\rangle_n = |a\rangle|\overline{0}\rangle_n = \sum_{k=1}^{n} \alpha_k |\xi_k\rangle |k\rangle |\overline{0}\rangle_n. \tag{3}$$

Then, controlled on the value of the second register, some fixed states $|\phi_k\rangle \in C^n$ are prepared in the third register, which (apart from being normalized) are completely arbitrary. This provides $$|\psi\rangle = R \cdot |a\rangle |\overline{0}\rangle_n = \sum_{k=1}^{n} \alpha_k |\xi_k\rangle |k\rangle |\phi_k\rangle, \tag{4}$$

where $R := \sum_{k=1}^{n} I_d \otimes |k\rangle \otimes k | \langle R(k)$ and $R(k) |\overline{0}\rangle_n = |\phi_k\rangle$ is an operation that prepares $|\phi_k\rangle$ for given k.

If the last register of state $|\psi\rangle$ is measured with an orthogonal measurement $\{I_n - \Pi, \Pi\}$, where $\Pi$ is some arbitrary projector, the probability of collapsing to subspace $\Pi$ and the post-measurement state is given by $$q := \langle \psi | (I_d \otimes I_n \otimes \Pi) | \psi \rangle = \sum_{k=1}^{n} \alpha_k^2 \langle \phi_k | \Pi | \phi_k \rangle \tag{5}$$

$$|\psi_\Pi\rangle := \frac{1}{\sqrt{q}} \sum_{k=1}^{n} \alpha_k |\xi_k\rangle |k\rangle \Pi |\phi_k\rangle. \tag{6}$$

How close the reduced state of the first two registers of $|\psi_\Pi\rangle$ is to the desired state $|b\rangle$, is characterized by $$p := \|(\langle b| \bigotimes I_n) |\psi_\Pi\rangle\|^2 = \tag{7}$$

$$\left\| \frac{1}{\sqrt{q}} \sum_{k=1}^{n} \alpha_k \beta_k \Pi |\phi_k\rangle \right\|^2 = \frac{1}{q} \sum_{k,l=1}^{n} \alpha_l \beta_l \alpha_k \beta_k \langle \phi_l | \Pi | \phi_k \rangle$$

If both measurements were indeed performed, the overall success probability would be pq, which may be very small. This is not too surprising given that the oracle was used only once. However, instead of measuring the last register of the state $|\psi_\Pi\rangle$, amplitude amplification is used, thus boosting the success probability at the cost of using more oracle calls.

The amplitude is amplified in the subspace $\Pi$ of the second register. Let $U := R \cdot (O \otimes I_n)$ be the operation that with one query to oracle O prepares the state $|\psi\rangle = U|\overline{0}\rangle_{dn}|\overline{0}\rangle_n$ defined in equation (4). Then, the algorithm is given by the following sequence of unitary operations:

$$\mathcal{A}_{QRS} := (\text{ref}_{|\psi\rangle} \cdot \text{ref}_{I_d \otimes I_n \otimes \Pi})^k U, \tag{8}$$

where $k = O(1/\sqrt{q})$ is the number of iterations of amplitude amplification. Here, reflections through the two subspaces are as follows:

$$\text{ref}_{I_d \otimes I_n \otimes \Pi} := I_d \otimes I_n \otimes (I_n - 2\Pi), \text{ref}_{|\psi\rangle} :=$$
$$I_{dn^2} - 2|\psi\rangle\langle\psi| \tag{9}$$

It is noted that the second reflection can also be expressed as follows:

$$\text{ref}_{|\psi\rangle} = U(I_d \otimes I_n \otimes I_n - 2|\overline{0},\overline{0},\overline{0}\rangle \langle \overline{0},\overline{0},\overline{0}|) U^\dagger \tag{10}$$

so it can be implemented using two queries to O. Thus, the total number of queries used by this algorithm is $2k+1 = O(1/\sqrt{q})$.

The final state $\rangle_{QRS} \cdot |\overline{0}\rangle \mathcal{A}_d |\overline{0}\rangle_n |\overline{0}\rangle_n$ is very close to $|\psi\rangle$, so its reduced state on the first two registers, if measured, would collapse to $|b\rangle$ with probability p defined in equation (7). Thus, by using amplitude amplification, the overall success probability from pq to p is boosted at the cost of increasing the number of oracle calls from 1 to $T=\Theta(1/\sqrt{q})$.

An implementation of the quantum rejection sampling algorithm is provided herein below in Table 1.

TABLE 1

Quantum Rejection Sampling Algorithm

Quantum rejection sampling algorithm $\mathcal{A}_{QRS}$
1. Start in initial state $|\overline{0}\rangle_d|\overline{0}\rangle_n|\overline{0}\rangle_n$.
2. Apply U.
3. Perform the following steps k times:
   - perform $\text{ref}_{I_d} \otimes I_n \otimes \Pi$ by applying $I_n - 2\Pi$ on the last register;
   - perform $\text{ref}_{|\psi\rangle}$ by applying $U^\dagger$, changing the relative phase of $|\overline{0},\overline{0},\overline{0}\rangle$ by a factor of −1, and then applying U.
4. Discard the last register.

The quantum rejection sampling algorithm of Table 1 is written in pseudo-code. The algorithm starts with a known state in step 1, then applies a controlled rotation by some pre-computed angle in step 2. Further, the algorithm performs a sequence of steps, as shown in the form of a while loop in step 3, each of which is a controlled rotation. This loop leads to an improvement of the approximation of the intermediate quantum state. At step 4, only the register holding the output should be returned.

Figure 7:
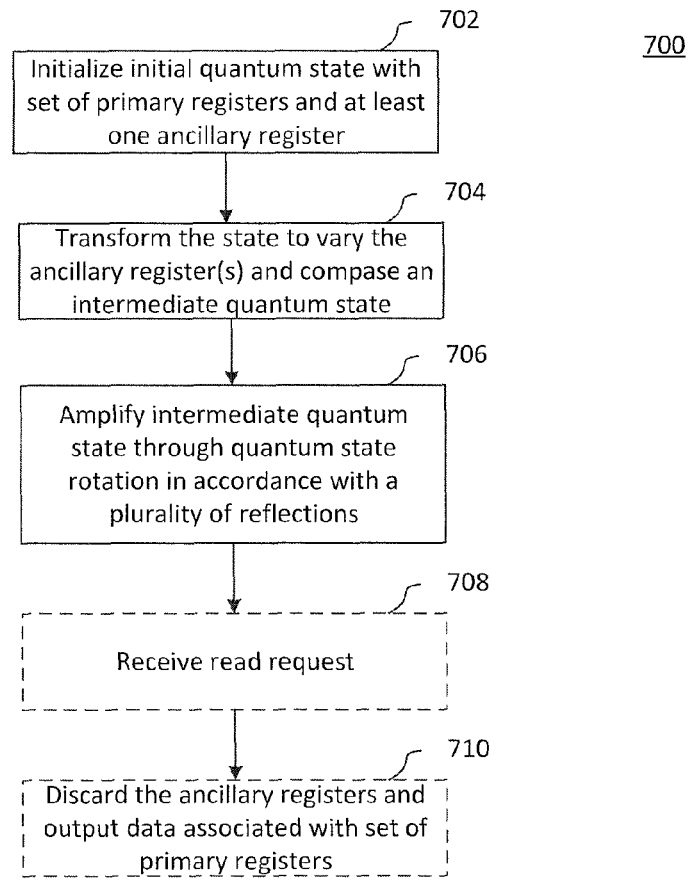
FIG. 7 is a high-level flow diagram of an embodiment of a method for transforming an initial quantum state to a target quantum state.

Referring now to FIG. 7, with continuing reference to FIG. 3, an exemplary method 700 for transforming an initial quantum state to a target quantum state of a quantum memory 309 is illustratively depicted. The algorithm of Table 1 is one exemplary implementation of the method 700. In addition, it should be understood that elements of the quantum component 306 can implement the method 700. Here, the initial quantum state can be denoted by superposed initial quantum sample states. For example, the initial quantum state can correspond to $$|a\rangle = \sum_{k=1}^{n} \alpha_k |\xi_k\rangle |k\rangle$$

and the initial quantum sample states can correspond to $|\xi_k\rangle$ and $|k\rangle$. Further, each of the respective sample states, for example, $|\xi_k\rangle$ and $|k\rangle$, can have a respective initial amplitude denoted by $\alpha_k$. In turn, the target quantum state can be denoted by superposed target quantum sample states. For example, the target quantum state can correspond to $$|b\rangle = \sum_{k=1}^{n} \beta_k |\xi_k\rangle |k\rangle$$

and the target quantum sample states can also correspond to $|\xi_k\rangle$ and $|k\rangle$. Moreover, each of the respective sample states, for example, $|\xi_k\rangle$ and $|k\rangle$, can have a respective initial amplitude denoted by $\beta_k$.

At step 702, the quantum computation module 310 can initialize the initial quantum state with a set of primary registers for the initial quantum state and with at least one ancillary register. For example, with respect to equations (3) and (4), above, the primary registers can correspond to $|\xi_k\rangle$ and $|k\rangle$ and the ancillary register can correspond to $|\overline{0}\rangle_n$ and $|\phi_k\rangle$. As discussed in more detail herein below, the method can be implemented with only one ancillary register to achieve a sufficient degree of accuracy and performance.

At step 704, the quantum computation module 310 can direct the quantum interaction controller 308 to transform the initial quantum state such that the set of primary registers reflects the initial quantum sample states and such that the ancillary register(s) is/are varied to compose an intermediate quantum state. For example, as indicated in Table 1, the default state $|\overline{0}\rangle_d|\overline{0}\rangle_n|\overline{0}\rangle_n$ can be initialized and can undergo a transformation U. As stated above, the transformation U transforms the default state $|\overline{0}\rangle_d 51 \overline{0}\rangle_n |\overline{0}\rangle_n$ into the initial quantum state $$|a\rangle |\overline{0}\rangle_n = \sum_{k=1}^{n} \alpha_k |\xi_k\rangle |k\rangle |\overline{0}\rangle_n,$$

associated with both the primary registers and the ancillary register. As noted above, the initial quantum state can be obtained by applying an oracle, which models a known physical operation that can be performed by the quantum interaction controller 308 on the quantum memory 309 to achieve a state $$|a\rangle = \sum_{k=1}^{n} \alpha_k |\xi_k\rangle |k\rangle$$

with known amplitudes $\alpha_k$ and unknown states $|\xi_k\rangle$.

We define a single-qubit unitary operation R(k) as follows:

$$R(k) := \frac{1}{\alpha_k} \begin{pmatrix} \sqrt{|\alpha_k|^2 - \beta_k^2} & -\beta_k \\ \beta_k & \sqrt{|\alpha_k|^2 - \beta_k^2} \end{pmatrix}$$

For those k for which $\alpha_k=0$, operation R(k) can be defined arbitrarily.

This is a rotation by angle whose sine is equal to $\beta_k/\alpha_k$. When applied to the last register, controlled on the value of k, the operation $U:=\sum_{k=1}^{n} I_d \otimes |k\rangle\langle k| R(k)$ corresponds to rotations by different angles in mutually orthogonal subspaces.

If U is applied to the state $|a\rangle$ together with an ancillary qubit initialized in state $|0\rangle$, the ancillary register is varied to compose an intermediate quantum state $$|\psi\rangle = U \cdot |a\rangle |\overline{0}\rangle_n = \sum_{k=1}^{n} \alpha_k |\xi_k\rangle |k\rangle |\phi_k\rangle,$$

where the states $|\phi_k\rangle$ can be arbitrary values. Here, a controlled quantum state rotation by a pre-computed angle can be applied, as indicated above. Thus, the resulting intermediate state $|\psi\rangle$ can have the same amplitudes $\alpha_k$ as the initial quantum sample states that are reflected in the primary registers.

At step 706, the quantum computation module 310 can direct the quantum interaction controller 308 to amplify the intermediate quantum state. For example, the quantum computation module 310 can direct the quantum interaction controller 308 to implement quantum state rotations in accordance with a plurality of reflections on the intermediate quantum state. For example, the quantum computation module 310 and the quantum interaction controller 308 can implement the while loop of step 3 of the Algorithm described in Table 1 above. As discussed above, the reflections result in the target quantum sample states of the target quantum state with a discarding of the ancillary register(s). Here, it should be understood that the target quantum state can be understood to be a quantum state that is within the constraints described above with respect to definition 2. As noted above, the target sample states can be maintained to be the initial sample states $|\xi_k\rangle$ and $|k\rangle$, where only the amplitudes are modified.

Optionally, at step 710, the system 306 can receive a read request through the I/O interface 304 from the conventional computer 302. In response, the quantum computation module 310 and the quantum measurement module 312 can discard the ancillary register(s) and can output data associated with the set of primary registers for the target quantum state. The data can be deduced by the quantum measurement module 312 from measurements it conducts on the quantum memory 309.

The optimality of the method is now explored. Returning again to Table 1, it should be noted that the cost of this quantum algorithm can be characterized as follows:

Lemma 1.

Algorithm $\mathcal{A}_{QRS}$ solves QSAMPLING$_{\alpha\to\beta}^c$ for $p_{min} \leq c \leq p_{max}$ with $O(1/\sqrt{q})$ queries to $O$ and $O^\dagger$, where q is the optimal value of the following SDP:

$$\max_{M \geq 0} TrM \text{ s.t. } \begin{array}{l} \forall k: \alpha_k^2 \geq M_{kk}, \\ Tr[(\beta \cdot \beta^T - cI)M] \geq 0 \end{array} \quad (11)$$

Proof.

Let $\beta \cdot \beta^T$ be the projector onto $\beta$ and M be the Gram matrix of vectors $\alpha_k \Pi |\phi_k\rangle$. Then the entries of B and M are given by $$B_{kl} := \beta_k \beta_l, M_{kl} := \alpha_k \alpha_l \langle \phi_k | \Pi | \phi_l \rangle \quad (12)$$

Quantities q and p introduced in equations (5) and (7) can be expressed in terms of B and M as follows:

$$q = TrM, \quad p = \frac{1}{q} Tr(BM). \quad (13)$$

The running time $T=\Theta(1/\sqrt{q})$ should be minimized, which is equivalent to maximizing q, by keeping the success probability p at least some constant c. Note that $p \geq c$ is equivalent to $Tr(BM) \geq cTrM$. This can be rewritten as $Tr(BM)-cTrM=Tr[(B-cI)M] \geq 0$. Thus, we obtain the SDP in Eq. (11).

3.2 Cost Analysis

The cost of the algorithm of Table 1 is determined herein below by solving the SDP in Lemma 1.

Lemma 2.

If $p_{min} \leq c \leq p_{max}$, then the SDP in Lemma 1 achieves its maximum at $M=\epsilon \cdot \epsilon^T$ with the objective value equal to $\|\epsilon\|_2^2$, where vector $\epsilon$ has components $\epsilon_k = \min\{\alpha_k, \gamma \beta_k\}$ and $\gamma=[0,1]$, is such that $$\beta_T \cdot \hat{\epsilon} = \sqrt{c} \quad (14)$$

Proof:

We show that the optimal value of the SDP (11) can be attained by a rank-1 matrix M. Imposing the additional constraint that M can be written as $M=\epsilon \cdot \epsilon^T$ for some $\epsilon \in R_n$, the optimization problem (11) reduces to $$\max \epsilon_k \geq 0 \|\epsilon\|_2^2 \text{ s.t. } \begin{array}{l} \forall k: \alpha_k \geq \epsilon_k \geq 0, \\ \beta^T \cdot \hat{\epsilon} \geq \sqrt{c} \end{array} \quad (15)$$

We show that the optimal value is attained by a vector $\epsilon$ such that $\epsilon_k = \min\{\alpha_k, \gamma \beta_k\}$ and $\beta^T \cdot \hat{\epsilon} \geq \sqrt{c}$. This vector satisfies the constraints in (15) and is therefore a feasible point, which implies that the objective value of (11) is at least $\|\epsilon\|_2^2$.

We now find a feasible dual solution that gives the same objective value for the dual of SDP (11), which can be written as $$\min_{\lambda_k \geq 0, \mu \geq 0} \sum_{k=1}^n \lambda_k \alpha_k^2 \text{ s.t. } \Lambda - I + \mu(cI-B) \geq 0, \quad (16)$$

where $\Lambda := \text{diag}(\lambda_k | k=1, \ldots, n)$. Indeed, if an objective value is feasible for both the primal and the dual, it implies that this is the optimal value.

It can be shown that the following solution is feasible for the dual:

$$\lambda_k = \mu \left( \frac{\beta_k}{\epsilon_k} \sum_{l=1}^n \beta_l \epsilon_l - c \right) + 1, \quad (17)$$

$$\mu = \frac{1 - \|\epsilon\|_2^2}{c - \left( \sum_{l=1}^n \beta_l \epsilon_l \right) \cdot \left( \sum_{l=1}^n \frac{\beta_k \alpha_k^2}{\epsilon_k} \right)}$$

This choice yields $\|\epsilon\|_2^2$ as the dual objective value, so it remains to show that it satisfies the constraints in (16). First, we prove that $\mu \geq 0$, which is equivalent to $$\left( \sum_{l=1}^n \beta_l \epsilon_l \right) \cdot \left( \sum_{k=1}^n \frac{\beta_k \alpha_k^2}{\epsilon_k} \right) \leq c. \quad (18)$$

The vector $\alpha$ can be decomposed into two orthogonal parts such that $\alpha = \alpha_\leq + \alpha_>$, where $\alpha_\leq$ corresponds to components $\alpha_k$ such that $\alpha_k \leq \gamma \beta_k$, and $\alpha_>$ corresponds to the remaining components. Decomposing $\beta$ and $\epsilon$ similarly, we have $\epsilon = \alpha_\leq + \gamma \beta_>$. The following are straightforward $$1 = \|\alpha_\leq\|_2^2 + \|\alpha_>\|_2^2 \quad (19)$$

$$\|\epsilon\|_2^2 = \|\alpha_\leq\|_2^2 + \gamma \|\beta_>\|_2^2 \quad (20)$$

$$\epsilon \cdot \beta = \alpha_\leq \cdot \beta_\leq + \gamma \|\beta_>\|_2^2 \quad (21)$$

Using these equalities, we obtain $$\sum_{k=1}^n \frac{\beta_k \alpha_k^2}{\epsilon_k} = \alpha_\leq \cdot \beta_\leq + \frac{1}{\gamma} \|\alpha_>\|_2^2 \quad (22)$$

$$= \alpha_\leq \cdot \beta_\leq + \frac{1}{\gamma}(1 - \|\alpha_\leq\|_2^2) \quad (23)$$

$$= \epsilon \cdot \beta + \frac{1}{\gamma}(1 - \|\epsilon\|_2^2) \quad (24)$$

Therefore, the left hand side of (18) can be written as $$\left(\sum_{l=1}^{n}\beta_l\varepsilon_l\right)\cdot\left(\sum_{k=1}^{n}\frac{\beta_k\alpha_k^2}{\varepsilon_k}\right)=(\varepsilon\cdot\beta)^2+\frac{\varepsilon\cdot\beta}{\gamma}(1-\|\varepsilon\|_2^2) \quad (25)$$

$$=c\|\varepsilon\|_2^2+\frac{\varepsilon\cdot\beta}{\gamma}(1-\|\varepsilon\|_2^2) \quad (26)$$

$$=\left(c-\frac{\varepsilon\cdot\beta}{\gamma}\right)\|\varepsilon\|_2^2+\frac{\varepsilon\cdot\beta}{\gamma} \quad (27)$$

where (14) has been used. Since $\varepsilon_k \leq \gamma\beta_k$, we have $\|\varepsilon\|_2^2 \leq \gamma\varepsilon\cdot\beta$, which, together with (14) implies that $$\frac{\varepsilon\cdot\beta}{\gamma}\leq c.$$

Together with $\|\varepsilon\|_2^2 \leq \|\alpha\|_2^2 = 1$ this implies $$\left(c-\frac{\varepsilon\cdot\beta}{\gamma}\right)\|\varepsilon\|_2^2+\frac{\varepsilon\cdot\beta}{\gamma}\leq c, \quad (28)$$

which proves (18) and, in turn, $\mu \geq 0$.

We now show that $\lambda_k \geq 0$ for all $k \in [n]$. From equations (17), we see that this is equivalent to showing $$\frac{\beta_k}{\varepsilon_k}\varepsilon\cdot\beta-c\geq -\frac{c-\varepsilon\cdot\beta\sum_{k=1}^{n}\frac{\beta_k\alpha_k^2}{\varepsilon_k}}{1-\|\varepsilon\|_2^2} \quad (29)$$

Note that $1 \geq \|\varepsilon\|_2^2$. By multiplying out everything with $1-\|\varepsilon\|_2^2$ and expanding, the following is obtained $$\frac{\beta_k}{\varepsilon_k}\varepsilon\cdot\beta(1-\|\varepsilon\|_2^2)+c\|\varepsilon\|_2^2\geq \varepsilon\cdot\beta\sum_{k=1}^{n}\frac{\beta_k\alpha_k^2}{\varepsilon_k} \quad (30)$$

Note that $c\|\varepsilon\|_2^2 = (\varepsilon\cdot\beta)^2$; thus, after rearranging terms and dividing by $\varepsilon\cdot\beta$, the following is obtained $$\frac{\beta_k}{\varepsilon_k}(1-\|\varepsilon\|_2^2)+\varepsilon\cdot\beta\sum_{k=1}^{n}\frac{\beta_k\alpha_k^2}{\varepsilon_k}. \quad (31)$$

If equation (24) is applied to the right hand side, the following is obtained $$\frac{\beta_k}{\varepsilon_k}(1-\|\varepsilon\|_2^2)+\varepsilon\cdot\beta\geq \varepsilon\cdot\beta+\frac{1}{\gamma}(1-\|\varepsilon\|_2^2). \quad (32)$$

After simplification, this yields $\varepsilon_k \leq \gamma\beta_k$, which is true by definition of $\varepsilon$. Thus, we have $\lambda_k \geq 0$.

Finally, it remains to show that the following matrix is semidefinite positive $$\Lambda-I+\mu(cI-B)=\mu\left[\left(\sum_{l=1}^{n}\beta_l\varepsilon_l\right)\cdot\mathrm{diag}(\beta_k/\varepsilon_k)-B\right]. \quad (33)$$

Since $\mu \geq 0$, it is the case if and only if $$\forall v \in R^n: \left(\sum_{l=1}^{n}\beta_l\varepsilon_l\right)\cdot\left(\sum_{k=1}^{n}\frac{v_k^2\beta_k}{\varepsilon_k}\right)\geq\left(\sum_{k=1}^{n}v_k\beta_k\right)^2. \quad (34)$$

This follows by Cauchy-Schwarz inequality:
$(\Sigma_{l=1}{}^n\beta_l\varepsilon_l)\cdot(\Sigma_{k=1}{}^n v_k^2\beta_k/\varepsilon_k)\geq(\Sigma_{k=1}{}^n\sqrt{\beta_k\varepsilon_k}\cdot\sqrt{v_k^2\beta_k/\varepsilon_k})^2$.

3.3 Single Ancillary Qubit Case

As demonstrated above, the optimal solution of the SDP (11) is a rank-1 matrix. Thus, for algorithms of the type considered above in section 3.1, there is, in most cases, no benefit of using more than one extra qubit as ancilla. Using that as a premise, a simplified description of the same algorithm is provided and the intuition behind the way it operates is explained.

Let $\varepsilon \in R^n$ be the vector that corresponds to the optimal solution of problem (15), as defined in Lemma 2. Then, for given s and each $k=1,\ldots,n$, a single-qubit unitary operation, as noted above, R(k) is defined as follows:

$$R(k):=\frac{1}{\alpha_k}\begin{pmatrix}\sqrt{|\alpha_k|^2-\varepsilon_k^2} & -\varepsilon_k \\ \varepsilon_k & \sqrt{|\alpha_k|^2-\varepsilon_k^2}\end{pmatrix} \quad (35)$$

For those k for which $\alpha_k=0$, operation R(k) can be defined arbitrarily.

As stated above, this is a rotation by angle whose sine is equal to $\varepsilon_k/\alpha_k$. When applied to the last register, controlled on the value of k, the operation $U_\varepsilon:=\Sigma_{k=1}{}^n I_d \otimes |k\rangle\langle k| \otimes R(k)$ corresponds to rotations by different angles in mutually orthogonal subspaces.

If $U_\varepsilon$ is applied to the state $|a\rangle$ together with an ancillary qubit initialized in state $|0\rangle$, the following is obtained:

$$|\psi_\varepsilon\rangle:=U_\varepsilon\cdot|a\rangle|0\rangle=\sum_{k=1}^{n}|\xi_k\rangle|k\rangle\left(\sqrt{|\alpha_k|^2-\varepsilon_k^2}|0\rangle+\varepsilon_k|1\rangle\right). \quad (36)$$

This extra qubit is a quantum version of the random coin deciding whether a sample k should be accepted (with probability $p_k=\varepsilon_k^2$) or rejected in the classical rejection sampling method. In the quantum case, measuring this qubit in the basis $\{|0\rangle,|1\rangle\}$ would yield the accept outcome $|1\rangle$ with overall probability and the corresponding post-measurement state given by $$q_\varepsilon:=\|(I_d\otimes I_n\otimes|1\rangle\langle 1|)|\psi_\varepsilon\rangle\|^2=\sum_{k=1}^{n}\varepsilon_k^2=\|\varepsilon\|_2^2, \quad (37)$$

$$|\psi_{\Pi,\varepsilon}\rangle:=\frac{1}{\|\varepsilon\|_2}\sum_{k=1}^{n}\varepsilon_k|\xi_k\rangle|k\rangle|1\rangle. \quad (38)$$

However, in the quantum case, this state can also be obtained by using $1/\|\epsilon\|_2$ steps of amplitude amplification to amplify the accept outcome $|1\rangle$. The reduced state on the first two registers of $|\psi_{\Pi,\epsilon}\rangle$ satisfies $$p_\epsilon := \|(\langle b| \otimes I_2)|\psi_{\Pi,\epsilon}\rangle\|^2 = (\beta^T \cdot \hat{\epsilon})^2 \geq c. \tag{39}$$

Thus, a state that is sufficiently close to $|b\rangle$ can be prepared using $O(1/\|\epsilon\|_2)$ oracle calls.

Figure 8:
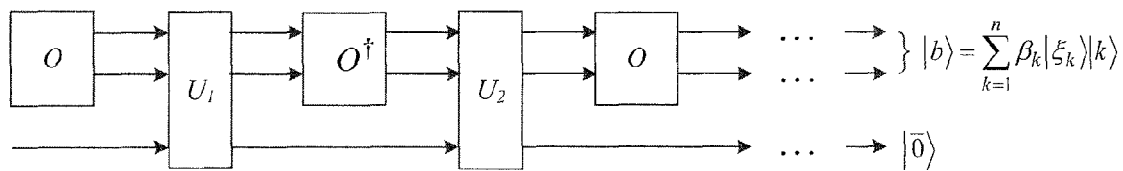
FIG. 8 is a high-level block/flow diagram of an overview of an embodiment of a quantum rejection sampling method in which only one ancillary register is employed.

FIG. 8 is a diagram of an overview of an embodiment of a quantum rejection sampling method in which only one ancillary register is employed. The output can be written in the state $|b\rangle$ on a dedicated output register of the quantum computer's memory 309. An example of a quantum rejection sampling algorithm in which only one ancillary register is used is provided herein below in Table 2.

TABLE 2

Quantum Rejection Sampling Algorithm

Quantum rejection sampling algorithm $\mathcal{A}_{QRS}$
1. Start in initial state $|\bar{0}\rangle_d |\bar{0}\rangle_n |\bar{0}\rangle$.
2. Apply $U_\epsilon$.
3. Perform the following steps t times:
 - perform ref$_{I_d \otimes I_n \otimes |1\rangle}$ by applying Pauli Z on the coin register;
 - perform ref$_{|\psi_\epsilon\rangle}$ by applying $U_\epsilon^\dagger$, changing the relative phase of $|\bar{0},\bar{0},0\rangle$ by a factor of $-1$, and then applying $U_\epsilon$.
4. Discard the last register.

Here, ref$_{I_d \otimes I_n \otimes |1\rangle} \langle 1| = I_d \otimes I_n \otimes (I_n - |1\rangle\langle 1|) = I_d \otimes I_n \otimes Z$ and ref$_{|\psi_\gamma\rangle} = I_{2dn} - 2|\psi_\epsilon\rangle\langle\psi_\epsilon| = U_\epsilon(I_d \otimes I_n \otimes I_2 - 2|\bar{0},\bar{0},0\rangle\langle\bar{0},\bar{0},0|)U_\epsilon^\dagger$.

It should be noted that the method 700 can be implemented in accordance with the algorithm of Table 2. For example, the default state $|\bar{0}\rangle_d |\bar{0}\rangle_n |\bar{0}\rangle$ can be initialized and $U_\epsilon$ can be applied in step 704. In addition, the amplification of step 706 can be implemented by applying step 3 in the algorithm of Table 2.

3.4 Matching Lower Bound

It can be shown that the algorithm described above is optimal by proving a matching lower bound. In addition to this, Lemmas 1 and 2 are used to prove Theorem 1.

Lemma 3.

Any quantum algorithm solving QSAMPLING$_{\alpha\to\beta}^c$ for $c\in[p_{min}, p_{max}]$ uses at least $\Omega(1/\|\epsilon\|_2)$ queries to $O$ and $O^\dagger$, where vector $\epsilon$ has components $\epsilon_k = \min\{\alpha_k, \gamma\beta_k\}$ and $\gamma\in[0,1]$ is such that $\beta^T \cdot \hat{\epsilon} = \sqrt{c}$.

Proof.

The lower bound is based on the hybrid argument, which consists in showing that an algorithm using a low number of queries to the oracle has trouble distinguishing different but yet similar oracles. Since the aim is to prove a lower bound, any set of oracles that will be hard to distinguish for the quantum algorithm can be chosen. Here, a set of oracles $\{O_x : x \in \{0,1\}_n\}$ is considered such that the unknown states $|\xi_k(x)\rangle$ only differ in their phases, more precisely, $O_x$ acts on a default state $|0\rangle$ as $$O_x |\bar{0}\rangle = \sum_{k=1}^n \alpha_k |\xi_k(x)\rangle |k\rangle \text{ where} \tag{40}$$

$$|\xi_k(x)\rangle = (-1)^{x_k} |\xi_k\rangle.$$

We also adversarially choose the action of these oracles on states orthogonal to $|\bar{0}\rangle$ in such a way that $$\||O_x|\psi\rangle - O_{x'}|\psi\rangle\| \leq \||O_x|\bar{0}\rangle - O_{x'}|\bar{0}\rangle\| \; \forall |\psi\rangle \perp |\bar{0}\rangle. \tag{41}$$

Therefore, we have $$\|O_x - O_{x'}\| = \||O_x|\bar{0}\rangle - O_{x'}|\bar{0}\rangle\| \tag{42}$$

$$= \left\|\sum_{k=1}^n \alpha_k\left((-1)^{x_k} - (-1)^{x'_k}\right)|\xi_k\rangle|k\rangle\right\| \tag{43}$$

$$= 2\sqrt{\sum_{k=1}^n |\alpha_k|^2 \delta_{x_k, x'_k}}. \tag{44}$$

An algorithm solving QSAMPLING$_{\alpha\to\beta}^c$ using T oracle calls is now considered. Let $|\psi_t(x)\rangle$ be the state of the algorithm after $t \leq T$ calls to $O_x$ or $O_x^\dagger$. Let us consider bit strings $x$ and $x'$ that only differ in the l-th position, i.e., $x' = x + e_l$, where $e_l$ is the vector with a 1 in the l-th position and 0 everywhere else. By the hybrid argument, we have $$\||\psi_t(x)\rangle - |\psi_t(x')\rangle\| \leq t \cdot \|O_x - O_{x'}\| = 2t\alpha_l. \tag{45}$$

The final state can be written as $$|\psi_T(x)\rangle = \sum_{k=1}^n (-1)^{x_k} \gamma_k(x) |\xi_k\rangle|k\rangle \tag{46}$$

where the positive amplitudes $\gamma_k(x)$, written as vectors $\gamma(x)$, satisfy $\beta^T \cdot \gamma(x) \geq \sqrt{c}$ for each $x \in \{0,1\}^n$ by correctness of the algorithm. Moreover, we have $$\||\psi_T(x)\rangle - |\psi_T(x')\rangle\| = \sqrt{|\gamma_l(x) + \gamma_l(x')|^2 + \sum_{k\neq l} |\gamma_k(x) + \gamma_k(x')|^2}, \tag{47}$$

so that the hybrid argument implies $$T \geq \frac{1}{2\alpha_l} \sqrt{|\gamma_l(x) + \gamma_l(x')|^2 + \sum_{k\neq l} |\gamma_k(x) + \gamma_k(x')|^2}. \tag{48}$$

Minimizing over any acceptable set of final states illustrates that the optimal value of the following optimization program is a lower bound on the query complexity of the problem $$\min_{\gamma(x)} T \text{ s.t. } \forall k, x : \gamma_k(x) \geq 0, \forall x: \|\gamma(x)\| = 1, \tag{49}$$

$$\forall x, l: \frac{1}{4\alpha_l^2}\left(|\gamma_l(x) + \gamma_l(x+e_l)|^2 + \sum_{k\neq l}|\gamma_k(x) - \gamma_k(x+e_l)|^2\right) \leq T^2,$$

$$\forall x: \beta^T \cdot \gamma(x) \geq \sqrt{c}$$

We first relax the constraint $\|\gamma(x)\|=1$ to $\|\gamma(x)\|\leq 1$, which can only decrease the optimal value, therefore still providing a lower bound. We then show that the optimal value can be attained for vectors $\gamma(x)$ that are independent of x. Indeed, let $\gamma(x)$ define any feasible point, and consider the average vector $$\gamma' = \frac{1}{2^n} \sum_{x \in \{0,1\}^n} \gamma(x). \tag{50}$$

Since $\beta_T \cdot \gamma(x) \geq \sqrt{c}$ and $\|\gamma(x)\|=1$ for all x, we have $\beta^T \cdot \gamma' \geq \sqrt{c}$ and $\|\gamma'\| \leq 1$ (by the triangle inequality). Below it will be shown that the norm can be increased back to 1. We now show that the third constraint in (49) is satisfied by $\gamma'$, that is, we will show that $\gamma_l'/\alpha_l < T$ for all l. We have $$\frac{\gamma_l'}{\alpha_l} = \frac{1}{2^n} \sum_{x \in \{0,1\}^n} \frac{\gamma_l(x) + \gamma_l(x+e_l)}{2\alpha_l} \tag{51}$$

$$\leq \frac{1}{2^n} \sum_{x \in \{0,1\}^n} \frac{1}{2\alpha_l} \sqrt{|\gamma_l(x) + \gamma_l(x+e_l)|^2 + \sum_{k \neq l} |\gamma_k(x) + \gamma_k(x+e_l)|^2} \leq T, \tag{52}$$

since each term in the sum is less than T by assumption. To show that if $\|\gamma'\|_2 < 1$ this norm to can be increased to 1 by modifying some components, we show that not all the constraints $\gamma_l'/\alpha_l \leq T$ can be saturated. Indeed, in that case we would have $\gamma'=T\alpha$ with $T<1$ since $\|\gamma'\|_2 \leq \|\alpha\|_2 = 1$. However, constraint $\beta_T \cdot \gamma'(x) \geq \sqrt{c}$ then implies $\beta^T \cdot \alpha \geq \sqrt{c}$, which contradicts the assumption $c \geq p_{min}$.

If $\|\gamma'\|_2 < 1$, let l be such that $\gamma_l'/\alpha_l < T$. We increase $\gamma_l'$ until either $\|\gamma\|=1$ or $\gamma_l'/\alpha_l = T$. We then repeat with another l such that $\gamma_l/\alpha_l < T$, until we reach $\|\gamma\|=1$. Note that while doing so, the other constraints remain satisfied, therefore we have proved that the optimization program admits feasible points where vectors $\gamma(x)$ are independent of x. This implies that we can impose this additional constraint without modifying the optimal value of the program. Therefore, the program reduces to $$\min_\gamma T \text{ s.t. } \|\gamma\|=1$$

$$0 \leq \gamma_k \leq T\alpha_k \forall k,$$

$$\beta^T \gamma \geq \sqrt{c} \tag{53}$$

Setting $\epsilon = \gamma/T$, we see that this is the same program as in Eq. (15), whose solution is therefore given by Lemma 2.

Now, all the elements to prove Theorem 1 have been obtained.

Theorem 1.

Let $p_{min} := (\beta^T \cdot \alpha)^2$ and $p_{max} := \Sigma_{k:\alpha_k > 0} |\beta_k|^2$. The quantum query complexity of QSAMPLING$_{\alpha \to \beta^p}$ for $p \in [p_{min}, p_{max}]$ is $\Theta(1/\|\epsilon\|_2)$ where $\epsilon_k = \min\{\alpha_k, \gamma\beta_k\}$ for $\gamma \in [0,1]$ such that $\beta_T \cdot \epsilon = \sqrt{p}$. For $p \leq p_{min}$ the query complexity is 1, and for $p > p_{max}$ it is infinite.

Proof.

When $p \leq p_{min}$, the state $|a\rangle$ is already close enough to $|b\rangle$ to satisfy the constraint on the success probability, therefore one call to O is sufficient, which is clearly optimal. When $p > p_{max}$, the oracle gives no information about some of the unknown states $|\xi_k\rangle$ (when $\alpha_k = 0$), but the target state should have some overlap on $|\xi_k\rangle |k\rangle$ to satisfy the constraint on the success probability; therefore, the problem is not solvable.

For the general case $p_{min} \leq p \leq p_{max}$, the upper bound comes from the algorithm in Lemma 1, whose cost is characterized in Lemma 2, and the matching lower bound is given in Lemma 3.

4 Application: Boolean Hidden Shift Problem

We demonstrate an application of the methods to the hidden shift problem in which we show that hidden shifts can be determined at a cost that can be completely determined by properties of the Fourier spectra of the functions alone.

4.1 Fourier Analysis on the Boolean Cube

Fourier analysis on the Boolean cube studies the $2^n$-dimensional vector space of all real-valued functions defined on the n-dimensional Boolean cube $F_2^n$. Thus, in the following definition, $f$ denotes a function of the from $F_2^n \to R$ (not a Boolean function). The Boolean case is discussed later.

Definition 4 (Fourier Transform).

The Fourier basis of $F_2^n$ consists of functions $\{\chi_w : w \in F_2^n\}$, where each $\chi_w : F_2^n \to \{1,-1\}$ is defined as $\psi_w(x) := (-1)^{w \cdot x}$, where $w \cdot x := \Sigma_{i=1}^n w_i x_i$ is the inner product in $F_2$. The Fourier transform of a function $f: F_2^n \to R$ is the function $\hat{f}: F_2^n \to R$ defined as $$\hat{f}(w) := \frac{1}{2^n} \sum_{x \in F_2^n} (-1)^{w \cdot x} f(x). \tag{54}$$

Note that $$\hat{f}(w) := E_x(X_w f) = \frac{1}{2^n} \sum_{x \in F_2^n} X_w(x) f(x),$$

which is another way to write the Fourier coefficients that is predominantly found in the computer science literature. The set $\{\hat{f}(w) : w \in F_2^n\}$ of all values of $\hat{f}$ is called the spectrum of $f$ and each of its elements is called a Fourier coefficient of $f$.

A Boolean function of the form $f: F_2^n \to F_2$ is now considered. To find its Fourier transform, $f$ should be associated with a real-valued function $F: F_2^n \to R$ in some way. Instead of the obvious correspondence (treating $0,1 \in F_2$ as real numbers) for the purposes here it is more natural to let F be the $(\pm 1)$-valued function defined by $$F(x) := (-1)^{f(x)}. \tag{55}$$

Definition 5 (Fourier Transform of a Boolean Function).

By slight abuse of notation, the Fourier transform of a Boolean function $f: F_2^n \to F_2$ is the function $\hat{f}: F_2^n \to R$ defined as $$\hat{f}(w) := E_x(\chi_w F) = \frac{1}{2^n} \sum_{x \in F_2^n} (-1)^{w \cdot x + f(x)}. \tag{56}$$

The Fourier transform of a Boolean function can also be expressed using the Hadamard transform which is the unitary matrix defined by $$H_{2^n} := \frac{1}{\sqrt{2^n}} \sum_{x,y \in F_2^n} (-1)^{x \cdot y} |x\rangle\langle y|. \tag{57}$$

This transformation can be obtained as the n-fold tensor product of the matrix $$H_{2^n} := \frac{1}{\sqrt{2}}\begin{pmatrix} 1 & 1 \\ 1 & -1 \end{pmatrix}$$

with itself, or in other words $H_{2^n} = H_2^{\otimes n}$. Clearly, we can compute the vector of Fourier coefficients $[\hat{f}(w)]_w$ from the (normalized) vector of inputs $$\frac{1}{\sqrt{2^n}}[(-1)^{f(x)}]_x.$$

Definition 6 (Bent Functions).

Let $f:F_2^n \to F_2$ be a Boolean function. We say that $f$ is bent if the Fourier coefficients $$\hat{f}(w) = \frac{1}{2^n}\sum_{x\in F_2^n}(-1)^{wx+f(x)}$$

satisfy $|\hat{f}(w)| = 2^{-n/2}$ for all $w \in F_2^n$, i.e., if the spectrum of $f$ is flat.

A necessary condition for bent functions in n variables to exist is that n is even. If $f$ is bent, then this implicitly defines another Boolean function via $2^{n/2}\hat{f}(w) =: (-1)^{f^*(w)}$. Then this function $f^*$ is again a bent function and called the dual bent function of $f$. By taking the dual twice we obtain $f$ back: $(f^*)^* = f$.

A simple example of a bent function is provided by the inner product function. The most simple instance is the function $f(x, y) := xy$ where $x, y \in F_2$. It is easy to verify that $f$ defines a bent function. This can be generalized to 2n variables and we obtain the inner product $$ip_n(x_1, \ldots, x_n, y_1, \ldots, y_n) := \sum_{i=1}^{n} x_i y_i. \quad (58)$$

It is straightforward to show that $ip_n$ is bent.

While many other examples of bent functions have been constructed, no complete classification is known. Besides the flatness of the Fourier spectrum, many equivalent characterizations of bent functions are known. One of these characterizations is that the truth table of a bent function, when considered as a binary vector of length $2^n$, has the maximal possible Hamming distance from the linear code formed by the set of truth tables of all affine Boolean functions in n variables.

4.2 Quantum Algorithm for the Boolean Hidden Shift Problem

The following is a description of how the quantum algorithm for QSAMPLING$_{\alpha \to \beta}$ can be applied to the Boolean hidden shift problem BHSP$_f$.

Theorem 2.

Let $f$ be a Boolean function and $\hat{f}$ denote its Fourier transform. The quantum query complexity of solving BHSP$_f$ with success probability p is $O(1/\|\epsilon\|_2)$, where $\epsilon_w = \min\{|\hat{f}_w|, \gamma/\sqrt{2^n}\}$ for $\gamma \in [0,1]$ such that $\|\hat{\epsilon}\|_1 = \sqrt{2^n p}$.

Proof.

$O_{f_s}$ is used to denote the phase oracle for function $f_s$. This is a diagonal matrix that acts on the standard basis vectors $x \in F_2^n$ as follows:

$$O_{f_s}|x\rangle := (-1)^{f(x+s)}|x\rangle. \quad (59)$$

Note that $O_{f_0}$ corresponds to the original unshifted function $f$. We now consider the quantum oracle $O_{f_s}$ conjugated by Hadamard transform. The resulting operation $$V(s) := H^{\otimes n} O_{f_s} H^{\otimes n} \quad (60)$$

is very useful, since, when acting on a register initialized in all-zeros state, it can be used to prepare the following quantum superposition:

$$|\psi_{\hat{f}}(s)\rangle := V(s)|0\rangle^{\otimes n} = \sum_{w \in F_2^n}(-1)^{w\cdot s}\hat{f}(w)|w\rangle. \quad (61)$$

Indeed, it acts on $|0\rangle^{\otimes n}$ as $$|0\rangle^{\otimes n} \xmapsto{H^{\otimes n}} \frac{1}{\sqrt{2^n}}\sum_{x \in F_2^n}|x\rangle \xmapsto{O_{f_s}} \frac{1}{\sqrt{2^n}}\sum_{x \in F_2^n}(-1)^{f(x+s)}|x\rangle \quad (62)$$

$$\xmapsto{H^{\otimes n}} \frac{1}{2^n}\sum_{x,w \in F_2^n}(-1)^{w\cdot x + f(x+s)}|w\rangle \quad (63)$$

$$= \sum_{w \in F_2^n}(-1)^{w\cdot s}\left(\frac{1}{2^n}\sum_{x \in F_2^n}(-1)^{w\cdot x+f(x)}\right)|w\rangle \quad (64)$$

If the Fourier coefficients $\hat{f}(w)$ could be eliminated from state $|\psi_{\hat{f}}(s)\rangle$, the following state would be obtained $$|\psi(s)\rangle := \frac{1}{\sqrt{2^n}}\sum_{w \in F_2^n}(-1)^{w\cdot s}|w\rangle \quad (65)$$

from which the hidden shift s can be easily recovered by applying the Hadamard transform $H^{\otimes n}$. Fortunately, the problem of transforming the state $|\psi_{\hat{f}}(s)\rangle$ to $|\psi(s)\rangle$ is a special case of QSAMPLING$_{\alpha \to \beta}$ with $$\alpha_w := |\hat{f}(w)|, \beta_w := 1/\sqrt{2^n}, |\xi_k\rangle := (-1)^{w\cdot s}|0\rangle. \quad (66)$$

As a consequence, Theorem 1 immediately provides a quantum algorithm for solving this problem.

4.3 Boosting the Success Probability

As noted above, the hidden shift can be found with constant probability. However, it is not immediately clear how to boost this probability close to 1, as checking if a given s is indeed a hidden shift could potentially utilize $2^n$ queries to the shifted function $f_s$, which might be significantly more than was needed to obtain a candidate shift.

How to boost the success probability to any constant is now shown. The basic idea is to check a potential solution using the standard controlled-SWAP test. Let s be the actual shift, and v be a candidate solution to be checked. Using one call to the oracle $O_{f_s}$, the following state can be easily prepared $$|\phi_f(s)\rangle = \frac{1}{\sqrt{2^n}} \sum_x (-1)^{f(x+s)}|x\rangle \quad (67)$$

Similarly, the state $|\phi_f(v)\rangle$ can be prepared using one call to the oracle $O_{f_0}$. The inner product between these states is $$\langle\phi_f(s)|\phi_f(v)\rangle = \frac{1}{2^n} \sum_x (-1)^{f(x+s)+f(x+v)} \quad (68)$$

$$= 1 - 2\gamma_{f,s+v}. \quad (69)$$

Therefore, a controlled-SWAP test will accept the candidate shift v with probability $$\frac{1 + \langle\phi_f(s)|\phi_f(v)\rangle}{2} = 1 - \gamma_{f,s+v}. \quad (70)$$

That is, it will always accept if s=v, and reject with probability at least γƒ otherwise. Repeating the controlled-SWAP test $O(1/\gamma f)$ times can ensure that a wrong candidate solution is rejected with large probability. Moreover, using once again quantum amplitude amplification, a quadratic improvement can be obtained, and therefore a wrong candidate can be rejected using only $$O\left(\frac{1}{\sqrt{\gamma f}}\right)$$

oracle calls.

To boost the success probability of the algorithm from ½ to any constant, it then suffices to repeat the algorithm $\mathcal{A}_{1/2}$ and checking its output using the controlled-SWAP test until a candidate solution is accepted. Note that both steps require $$O\left(\frac{1}{\sqrt{\gamma f}}\right)$$

oracle calls and are repeated a constant number of times, therefore the overall cost of the algorithm only increases by a constant factor.

4.4 Hidden Shift Problem Example

To illustrate how the quantum rejection sampling methods described above can be applied is the hidden shift problem, a simple example is provided below in Tables 3 and 4. Here, one is given access to two functions, where one function is a shifted version of the other function and the task is to identify the shift. For example, the function $f_s=f(x+s)$ is a shifted version of $f(x)$ with a shift s. In the example of Tables 3 and 4, the shift is s=10.

TABLE 3

Hidden Shift Problem Example - Original function f(x)

| x | f(x) |
|---|------|
| 00 | 0 |
| 01 | 1 |

TABLE 3-continued

Hidden Shift Problem Example - Original function f(x)

| x | f(x) |
|---|------|
| 10 | 1 |
| 11 | 0 |

TABLE 4

Hidden Shift Problem Example - Shifted function $f_s$ = f(x + s)

| x | $f_s(x)$ |
|---|----------|
| 00 | 1 |
| 01 | 0 |
| 10 | 0 |
| 11 | 1 |

Figure 9:
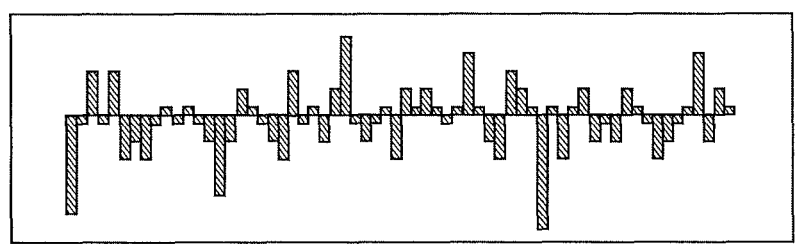
FIG. 9 is a diagram of an initial quantum state for a Boolean hidden shift problem example.
Figure 10:
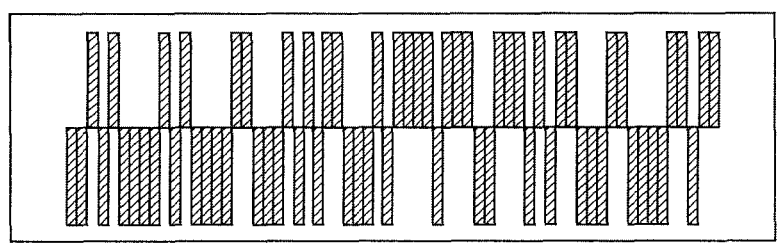
FIG. 10 is a diagram of a target quantum state for the Boolean hidden shift problem example.
Figure 11:
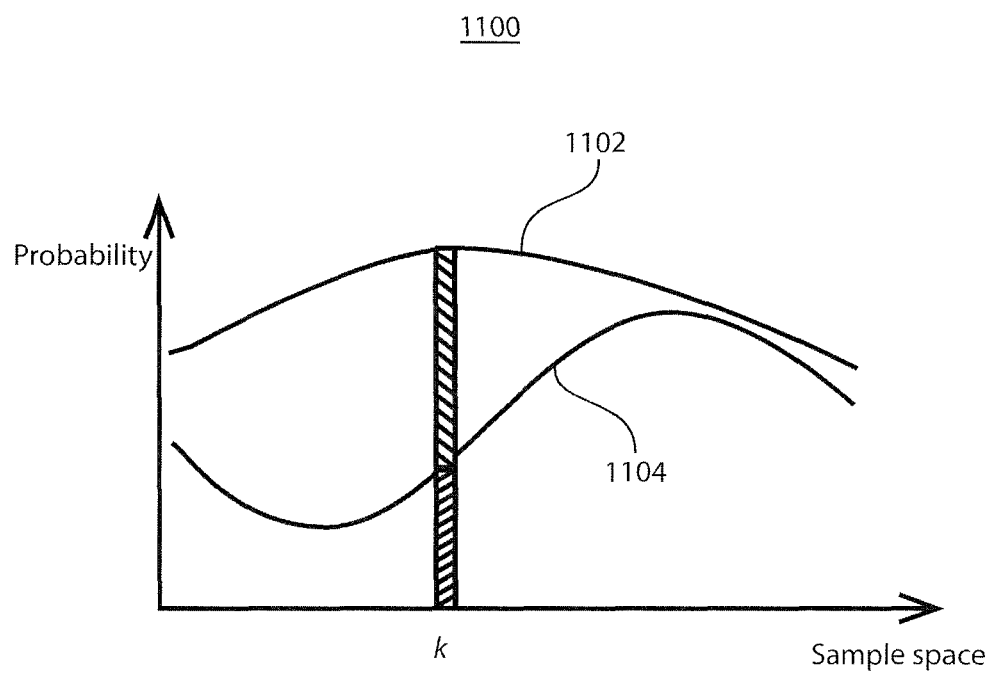
FIG. 11 is a graph illustrating probability distributions according to a classical rejection sampling method.

For hidden shift problems in general, finding the hidden shift s becomes difficult once the number of variables increases to some moderate number. Under some reasonable assumptions, it can even be shown that a classical computer cannot solve such problems efficiently at all. A quantum computer on the other hand can solve the hidden shift problem by applying a certain strategy that comprises preparing a certain quantum state first and then manipulating the amplitudes of this state into new amplitudes. This is further illustrated in FIGS. 9 and 10. For example, FIGS. 9 and 10 are diagrams, 900 and 1000, of an initial or given quantum state, $\Sigma_w(-1)^{w\cdot s}\hat{f}(w)|w\rangle$, and a target quantum state, $$\sum_w (-1)^{w\cdot s} \frac{1}{\sqrt{2^n}} |w\rangle,$$

respectively. In the diagrams of FIGS. 9 and 10, the horizontal axis denotes the variable w and the vertical axis denotes the value of the $w^{th}$ component of the quantum state. The input or initial state $\Sigma_w(-1)^{w\cdot s}\hat{f}(w)|w\rangle$ has some components that depend on the Fourier spectrum of the given function. The output or target state $\Sigma_w(-1)^{w\cdot s}\hat{f}(w)|w\rangle$ does not have a dependence on the Fourier spectrum anymore and contains the information about the hidden shift in the form of a basis state of a complex character from which the shift can be easily extracted based on the methods described above. Here, the quantum rejection method described above can do away with the Fourier coefficients $\hat{f}(w)$. The resulting quantum algorithm can use a "water-filling" of the Fourier spectrum to perform the controlled rotations that occur in the quantum rejection method.

The techniques described herein can be applied to solve the hidden shift problem for any Boolean function $f$. Here, the complexity of the resulting algorithm depends on the Fourier spectrum of $f$. In the limiting cases of flat or highly peaked Fourier spectra, it can be shown that Table 5, below, accurately summarizes what is known about the quantum and the classical query complexities of these two external problems.

TABLE 5

Complexity of Resampling Algorithms for hidden shift problem for
Bent functions and Delta functions

| Functions | Classical | Quantum |
| --- | --- | --- |
| Bent functions | $\Omega(n)$ | $\frac{1}{\Theta(\sqrt{2^n})}$ |
| Delta functions | $\Theta(2^n)$ | |

For a general Boolean function, the hidden shift problem can be seen as lying somewhere between these two extreme cases.

As indicated above, the quantum rejection methods described herein can be used to prepare certain quantum states. In accordance with one example, the quantum states can be prepared efficiently in the memory of a quantum computer. The ability to perform quantum state preparations can be an important tool for the design of quantum algorithms. However, it should be understood that the methods described herein can be applied outside the realm of quantum computing. For example, the methods can be applied in the field of quantum physics itself. For example, the methods can be utilized in situations where the goal is to prepare a desired quantum population on the energy levels of a system.

Having described preferred embodiments of quantum rejection sampling systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transforming an initial quantum state, denoted by superposed initial quantum sample states, to a target quantum state, denoted by superposed target quantum sample states, comprising:
    initializing the initial quantum state with a set of primary registers for the initial quantum state and with at least one ancillary register;
    transforming the initial quantum state such that the set of primary registers reflects the initial quantum sample states and such that the at least one ancillary register is varied to compose an intermediate quantum state; and
    amplifying the intermediate quantum state by implementing quantum state rotations in accordance with a plurality of reflections on the intermediate quantum state such that the reflections result in the target quantum sample states of the target quantum state with a discarding of the at least one ancillary register.

2. The method of claim 1, further comprising:
    in response to a read request, outputting data associated with the set of primary registers for the target quantum state and discarding the at least one ancillary register.

3. The method of claim 1, wherein each of the initial quantum sample states has a respective initial amplitude, wherein each of the target quantum sample states has a respective target amplitude and wherein the transforming the initial quantum state transforms the initial quantum state such that the set of primary registers reflects the initial amplitudes.

4. The method of claim 3, wherein the target sample states are the same as the initial quantum sample states after the amplifying.

5. The method of claim 4, wherein the target amplitudes are different from the initial amplitudes as a result of the amplifying.

6. The method of claim 1, wherein the at least one ancillary register is only one ancillary register.

7. The method of claim 1, wherein the transforming the initial quantum state varies the at least one ancillary register to an arbitrary value.

8. The method of claim 1, wherein the transforming the initial quantum state applies a controlled quantum state rotation by a pre-computed angle.

9. A non-transitory computer readable storage medium comprising a computer readable program, wherein the computer readable program when executed on a computer causes the computer to direct the transformation of an initial quantum state, denoted by superposed initial quantum sample states, to a target quantum state, denoted by superposed target quantum sample states, by performing the steps of:
    initializing the initial quantum state with a set of primary registers for the initial quantum state and with at least one ancillary register;
    directing a transformation of the initial quantum state such that the set of primary registers reflects the initial quantum sample states and such that the at least ancillary register is varied to compose an intermediate quantum state; and
    directing an amplification of the intermediate quantum state by implementing quantum state rotations in accordance with a plurality of reflections on the intermediate quantum state such that the reflections result in the target quantum sample states of the target quantum state with a discarding of the at least one ancillary register.

10. The non-transitory computer readable storage medium of claim 9, wherein the steps further comprise:
    in response to a read request, outputting data associated with the set of primary registers for the target quantum state and discarding the at least one ancillary register.

11. The non-transitory computer readable storage medium of claim 9, wherein each of the initial quantum sample states has a respective initial amplitude, wherein each of the target quantum sample states has a respective target amplitude and wherein the transformation of the initial quantum state transforms the initial quantum state such that the set of primary registers reflects the initial amplitudes.

12. The non-transitory computer readable storage medium of claim 11, wherein the target sample states are the same as the initial quantum sample states after the amplification, wherein the target amplitudes are different from the initial amplitudes as a result of the amplification and wherein the at least one ancillary register is only one ancillary register.

13. A system for transforming an initial quantum state, denoted by superposed initial quantum sample states, to a target quantum state, denoted by superposed target quantum sample states, comprising:
    a quantum memory element;
    a quantum interaction controller configured to change quantum states of the quantum memory element by implementing quantum state rotations; and
    a quantum computation module configured to initialize the initial quantum state with a set of primary registers for the initial quantum state and with at least one ancillary register, to direct the quantum interaction controller to transform the initial quantum state such that the set of primary registers reflects the initial quantum sample states and the at least one ancillary register is varied to compose an intermediate quantum state, and to direct the quantum interaction controller to amplify the intermediate quantum state by implementing the quantum state rotations in accordance with a plurality of reflections on the intermediate quantum state such that the reflections result in the target quantum sample states of the target quantum state with a discarding of the at least one ancillary register.

14. The system of claim 13, wherein the quantum computation module is further configured to, in response to a read request, output data associated with the set of primary registers for the target quantum state and discard the at least one ancillary register.

15. The system of claim 13, wherein each of the initial quantum sample states has a respective initial amplitude, wherein each of the target quantum sample states has a respective target amplitude and wherein the quantum computation module is further configured to direct the quantum interaction controller to transform the initial quantum state such that the set of primary registers reflects the initial amplitudes.

16. The system of claim 15, wherein the target sample states are the same as the initial quantum sample states after the amplification by the quantum interaction controller.

17. The system of claim 16, wherein the target amplitudes are different from the initial amplitudes as a result of the amplification by the quantum interaction controller.

18. The system of claim 13, wherein the at least one ancillary register is only one ancillary register.

19. The system of claim 13, wherein the quantum computation module is further configured to direct the quantum interaction controller to transform the initial quantum state such that the at least one ancillary register is set to an arbitrary value.

20. The system of claim 13, wherein the quantum computation module is further configured to direct the quantum interaction controller to transform the initial quantum state such that the quantum interaction controller applies a controlled quantum state rotation by a pre-computed angle.

* * * * *